United States Patent [19] [11] 3,956,584
Tanaka et al. [45] May 11, 1976

[54] OPTICAL SYSTEM FOR A TELEVISION CAMERA WITH A BIAS-LIGHT EMITTING DEVICE

[75] Inventors: Kazuo Tanaka, Tokyo; Youichi Okuno, Kanagawa; Kazuya Matsumoto, Kanagawa; Aiichiro Koyama, Kanagawa; Tomoaki Kawamura, Kanagawa; Takehiko Kiyohara, Kanagawa, all of Japan

[73] Assignee: Canon Kabushiki Kaisha, Tokyo, Japan

[22] Filed: Apr. 4, 1975

[21] Appl. No.: 565,210

[30] Foreign Application Priority Data
Apr. 10, 1974 Japan................................ 49-40784

[52] U.S. Cl................................ 178/7.2; 178/7.87
[51] Int. Cl.[2]......................................... H04N 5/30
[58] Field of Search ............... 178/7.1, 7.2; 358/55; 350/162 R

[56] References Cited
UNITED STATES PATENTS 3,610,818  10/1971  Bachmann............................ 358/55
3,767,846  10/1973  Okubo............................ 178/7.2 X
3,905,676  9/1975  Ulrich........................ 350/162 R X Primary Examiner—Robert L. Richardson
Assistant Examiner—Mitchell Saffian
Attorney, Agent, or Firm—Toren, McGeady and Stanger

[57] ABSTRACT

An optical system for a television camera provided with a device for emitting bias-light which is directed to the image pickup tube. Rays of light coming from a light source and entering a light guide plate at a side edge thereof are guided through the interior of the plate toward the opposite side edge after a number of successive total internal reflections from the two boundary surfaces of the plate. The surface of the plate near to the image pickup tube is provided with a diffraction grating formed therein to diffract a fraction of the light rays entering the plate, and to direct it toward the image pickup tube, thereby the image pickup tube is illuminated by the diffracted rays of light.

2 Claims, 7 Drawing Figures

OPTICAL SYSTEM FOR A TELEVISION CAMERA WITH A BIAS-LIGHT EMITTING DEVICE

BACKGROUND OF THE INVENTION

1. Field of the Invention

This invention relates to television cameras, and more particularly to a bias-light emitting device for use in an optical system of a television camera in which a light guiding means having an entrance aperture adjacent a light source is provided with a diffraction grating formed in the total internal reflection surface of the guiding means for diffracting a fraction of the light rays being guided therethrough, and for directing the fraction toward the image pickup tube.

2. Description of the Prior Art

There are known television cameras employing bias-light devices, as, for example, in U.S. Pat. No. 3,610,818, where a half mirror is disposed between the objective lens and the image pickup tube, with the reflecting surface thereof being inclined from the optical axis of the objective lens to direct light from a bias-light source positioned outside of the optical path thereof to the image pickup tube. This arrangement, however, has a drawback that a relatively large space is necessary for the provision of the half mirror in the optical path of the system.

U.S. Pat. No. 3,767,846 discloses another type of bias-light emitting device in which a number of acrylic resin rods are employed to transmit illumination light from the outside of the optical path to the image pickup tube. The employment of rods, however, limits the possibility of increasing the light emitting area.

SUMMARY OF THE INVENTION

An object of the invention is to provide an optical system for a television camera having a bias-light emitting device of such dimensions that it can be easily located between the objective lens and the image pickup tube without unduly increasing the space therebetween.

Another object of the invention is to provide an optical system for a television camera having a bias-light emitting device of such construction as to derive a design flexibility allowing a desired increase in the light emitting area.

To achieve these objects, the present invention contemplates the use of light guide means such as in the form of a transparent glass plate having two flat boundary faces and having a light entrance aperture at a side edge thereof adjacent a bias-light source in combination with a diffraction grating formed in the one of the two boundary faces which is near to the image pickup tube, or at a location between the two boundary faces to diffract a fraction of the light rays entering the plate at the entrance aperture and passing through the interior of the plate as guided by total internal reflection, and to direct the fraction toward the image pickup tube. In this manner, the image pickup tube is illuminated by the diffracted light rays. With this arrangement, there is no need to provide a large space which would be otherwise necessary when the half mirror is used as arranged in the optical path in inclined relation to the optical axis. Further, the diffraction grating may be positioned transversely in the image forming light beam from the objective lens without reducing the image quality, thereby it being made possible to increase the size of the diffraction grating with an increase in the light emitting area.

DESCRIPTION OF THE PREFERRED EMBODIMENT

Figure 1:
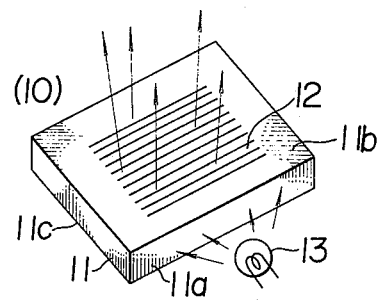
FIG. 1 is a schematic perspective view of an example of a bias-light emitting device according to a preferred embodiment of the present invention.
Figure 2:
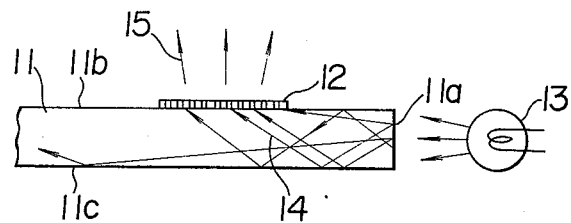
FIG. 2 is a sectional view of the device of FIG. 1.

Referring to FIGS. 1 and 2, a bias-light emitting device which is generally indicated at 10 is illustrated as comprising a transparent rigid plate 11, typically of glass. Plate 11 has a light entrance aperture at a side edge 11a thereof adjacent a bias-light source or a lamp 13 and having two flat boundary faces 11b and 11c, and a diffraction grating 12 formed in one of the two faces 11b and 11c. Rays 14 of light coming from lamp 13 and entering plate 11 at the aperture 11a are guided sideways by total internal reflection from the two boundary faces 11b and 11c, and a fraction 15 of the light rays meeting the face 11b is diffracted by the diffraction grating 12.

Figure 3:
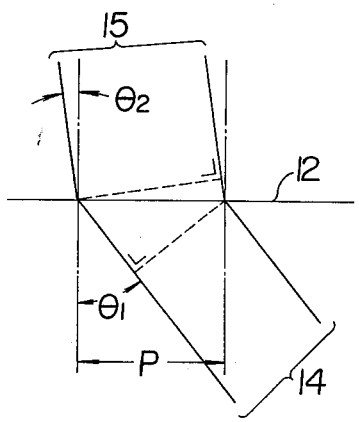
FIG. 3 is a diagram illustrating the diffraction of rays in the device of FIGS. 1 and 2.

In general, all of the rays internally meeting the boundary surface at angles larger than the critical angle for total reflection are subject to total internal reflection. Therefore, there is no chance that some of the said rays will be caused to emit from said boundary surface. When a diffraction grating is formed in this boundary surface by a holographic technique as disclosed in U.S. Pat. application Ser. No. 422,337, however, there arises a chance that some of the rays meeting the diffraction grating are caused to emit from the boundary surface. Such a function of the diffraction grating is better understood from FIG. 3. Suppose that a beam of parallel light rays 14 coming from lamp 13 without, or after a number of successive total internal reflections from the two boundary surfaces 11b and 11c is incident upon the diffraction grating 12 at an angle $\theta_1$ with respect to the normal line thereof, the angle $\theta_2$ at which a beam of diffracted rays 15 emits from the boundary surface may be expressed by $$\theta_2 = \sin^{-1}\left\{\sin\theta + \frac{n\lambda}{P}\right\}$$

wherein $n$ is an integer representing the degree of order of the diffraction spectrum; $P$ is the interval between successive two grating lines; and $\lambda$ is the wavelength of light. It is to be noted that lamp 13 projects light rays in various directions, namely, the possible angles of incidence are distributed in a relatively wide range, and that the degrees of order from zero to three are effective, and further that the wavelengths of light rays available from lamp 13 are distributed over a wide range. As a result, rays 14 meeting the diffraction grating are diffracted in various directions, that is, are caused to emit in diffusion light from the boundary surface. In the foregoing explanation, the diffraction grating is illustrated as arranged in the boundary surface of plate 11, but may be provided at a location between the boundary surfaces 11b and 11c. In the latter connection, the diffracted rays 15 are internally incident upon the boundary surface at angles of incidence smaller than the critical angle for total reflection, thus exiting from either of the boundary surfaces.

Figure 4:
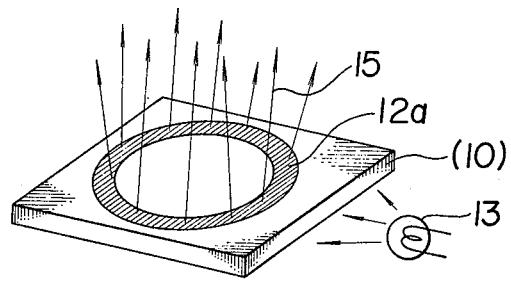
FIG. 4 is a schematic perspective view of another example of a bias-light emitting device according to the invention.

The diffraction grating need not necessarily be square or rectangular as shown in FIG. 1. It may be formed in a ring-shape, or any other configuration as shown in FIG. 4. In this case, light rays from a lamp 13 enters a plate 11 at one side edge thereof, and a fraction of the light rays meeting the diffraction grating 12a without or after a number of successive total internal reflections is split off to emit therefrom as diffusion light rays 15.

Figure 5:
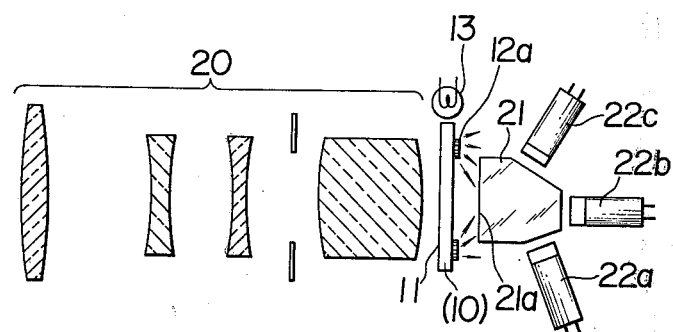
FIG. 5 is a partially sectional, partially elevational view of an example of application of the device of FIG. 4 to an optical system of a television camera according to the invention.
Figure 6:
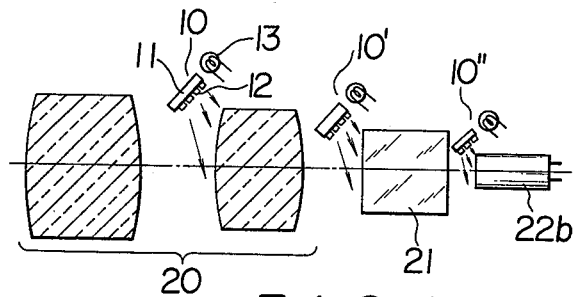
FIG. 6 is a similar view showing another example of application of the invention.

FIG. 5 shows an example of a television camera employing the bias-light emitting device of FIG. 4. The television camera comprises an objective lens system 20, a three color separation image forming prism system or a dichroic mirror light-splitting system 21, and three image pickup tubes 22a, 22b and 22c disposed to receive separate images from the system 21. The plate 11 is positioned in a spaced between the objective lens system 20 and the light splitting system 21 in transversely disposed relation to the optical axis of the lens 20, with the diffraction grating 12a facing the incident surface 21a of light-splitting system 21. Upon energization of lamp 13, the incident surface 21a is illuminated uniformly by diffusion light emitting from the diffraction grating 12a of ring-shape. The plate 11 need not necessarily be disposed with the diffraction grating 12a bearing face perpendicular to the optical axis of the objective lens 20. It may be arranged outside of the image forming beam from the objective lens while being disposed with the diffraction grating thereof facing the surface to be illuminated. In this case, it is preferred to employ the device of FIG. 1. An example of such arrangement is shown in FIG. 6, where the same numerals are employed to denote similar parts to those of FIGS. 1 and 5, and wherein three bias-light emitting devices of FIG. 1 are employed. The first device 10 is arranged in the marginal portion of a space between two successive lens elements of objective lens system 20 to illuminate the one of the lens surfaces thereof which faces the diffraction grating 12 of device 10. The second and third devices 10' and 10'' are arranged in similar manner to that described above for illuminating the light-splitting system 21, and the image pickup tube 22b respectively. With the television camera of FIG. 6, it is, of course, possible to replace each or any one of the devices 10, 10' and 10'' with the device of FIG. 4, provided that each of the devices of FIG. 4 is disposed in such a manner as shown in FIG. 5.

Figure 7:
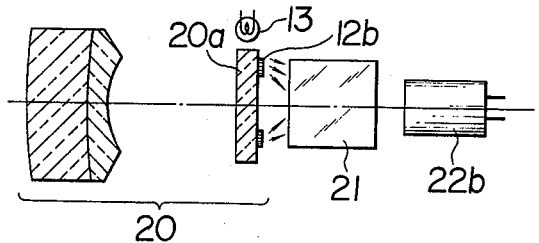
FIG. 7 is a similar view showing still another example of application of the invention.

FIG. 7 shows an alternate embodiment of the invention in which a diffraction grating 12b is provided in one surface of an optical element, in this instance, a rearmost lens element 20a, and the bias-light source 13 is positioned adjacent the peripheral edge of element 20a, the parts 12a, 20a and 13 constituting the bias-light emitting device of the invention. The entrance surface of light-splitting system 21 facing the diffraction grating 12b is illuminated by diffusion light from the device. Instead of employing the direct arrangement of a lamp 13 adjacent the side edge of element 20a, an indirect arrangement with a light carrying fiber device positioned between lamp 13 and element 20a may be used.

It will be seen from the foregoing description that the bias-light emitting device of the invention can be easily located in a suitable space available in a conventional optical system for a television camera without substantial modification of the lens and camera structures. Further, the present invention provides a possibility of employing one or more optical elements available in the optical system as the light guiding means of the bias-light emitting device, thereby giving an additional advantage of reducing the complexity of the completed television camera system employing the bias-light emitting device. Another advantage deriving from the increased design flexibility of configuration of the light emitting area is that the efficiency of illumination can be controlled in a desired manner.

What is claimed is:

1. An optical system for a television camera with a bias-light emitting device comprising:
   a. an objective lens,
   b. an image pickup tube arranged in coaxial alignment with said objective lens, and
   c. said bias-light emitting device arranged to illuminate said image pickup tube with light from a light source, said bias-light emitting device including said light source; light-guiding means having a light entrance aperture adjacent said light source and having two boundary faces between which rays of light coming from said light source through said aperture are guided by total internal reflection, and a diffraction grating formed in the one of said two boundary faces of said light guiding means which is near to said image takeup tube, said diffraction grating splitting off a fraction of said light rays being reflected from either of said boundary faces, and directing said fraction toward said image pickup tube.

2. An optical system for a television camera with a bias-light emitting device comprising:
   a. an objective lens,
   b. an image pickup tube arranged in a coaxial alignment with said objective lens, and
   c. said bias-light emitting device arranged to illuminate said image pickup tube with light from a light source: said bias-light emitting device including said light source; light-guiding means having a light entrance aperture adjacent said light source and having two boundary faces between which rays of light coming from said light source through said entrance aperture are guided by total internal reflection, and a diffraction grating provided at a location between said two boundary faces of said light guiding means, said diffraction grating splitting off a fraction of said light rays being reflected from either of said two boundary faces, and directing said fraction through the one of said two boundary faces which is near to the image pickup tube toward said image pickup tube.

* * * * *